(12) United States Patent
Chenthamarakshan et al.

(10) Patent No.: US 8,422,786 B2
(45) Date of Patent: Apr. 16, 2013

(54) ANALYZING DOCUMENTS USING STORED TEMPLATES

(75) Inventors: Vijil E. Chenthamarakshan, Kerala (IN); Rafah A. Hosn, New York, NY (US); Nandakishore Kambhatla, Bangalore (IN); Debapriyo Majumdar, Kolkata (IN); Shajith I. Mohamed, Bangalore (IN); Soumitra Sarkar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 12/732,278

(22) Filed: Mar. 26, 2010

(65) Prior Publication Data

US 2011/0235909 A1    Sep. 29, 2011

(51) Int. Cl.
*G06K 9/34*     (2006.01)
*G06K 9/00*     (2006.01)

(52) U.S. Cl.
USPC .......................................... 382/173; 382/181

(58) Field of Classification Search ........................ None
See application file for complete search history.

(56) References Cited

U.S. PATENT DOCUMENTS

| | | | |
|---|---|---|---|
| 8,046,681 B2* | 10/2011 | Vydiswaran et al. | 715/234 |
| 2007/0168382 A1* | 7/2007 | Tillberg et al. | 707/102 |
| 2008/0030798 A1* | 2/2008 | O'Neil | 358/448 |
| 2009/0049375 A1* | 2/2009 | Aughenbaugh et al. | 715/253 |

* cited by examiner

*Primary Examiner* — Li Liu
(74) *Attorney, Agent, or Firm* — Ference & Associates, LLC (57) ABSTRACT

A method, a system and a computer program product for analyzing a document are disclosed. In response to receiving the document, the document is partitioned into a plurality of segments using a set of pre-defined attributes. The plurality of segments of the document is mapped with corresponding segments of at least one template selected from a set of stored templates. A first template from the set of stored templates is selected and a group of segments in the first template is identified by computing at least one of a structural similarity and a textual similarity associated with the group of segments compared with the plurality of segments of the document. A subset of segments from the group of segments is aligned with corresponding segments from the plurality of segments of the document. A set of scores is computed using a set of pre-defined criteria, in response to the mapping. The document is analyzed based on the computed set of scores.

14 Claims, 5 Drawing Sheets

ANALYZING DOCUMENTS USING STORED TEMPLATES

BACKGROUND

Typically, businesses have a multitude of documents that are used to define business relationships with their customers, vendors, business partners or other business entities. Conventionally, these documents are stored in a physical storage as well as using computer servers for easy access and retrieval. The mechanism for computer server based storage of such documents may use file servers or a structured data, for example, a relational database.

BRIEF SUMMARY

Embodiments of the invention are directed to a method, a system and a computer program product for analyzing a document. Accordingly, embodiments of the invention receive the document and partition the document into a plurality of segments using a set of pre-defined attributes. The plurality of segments of the document is mapped with corresponding segments of at least one template selected from a set of stored templates, the stored templates being retrieved from a repository and may be at least one of a structure or unstructured format. A first template is selected from the set of stored templates. In a further embodiment, a group of segments in the first template is identified by computing at least one of a structural similarity and a textual similarity associated with the group of segments compared with the plurality of segments of the document. In yet a further embodiment a subset of segments from the group of segments is aligned with corresponding segments from the plurality of segments of the document. Further a set of scores is computed using a set of pre-defined criteria, in response to the mapping to categorize the document as relevant or not. The document is further analyzed based on the computed set of scores.

BRIEF DESCRIPTION OF THE SEVERAL VIEWS OF THE DRAWINGS

Embodiments of the invention are described below, by way of example only, with reference to the following schematic drawings, where.

DETAILED DESCRIPTION

It is desirable to evolve and enforce uniform standards across an enterprise in order to effectively manage and regulate the business of the enterprise with variety of external entities, especially when the number of business transactions is large. Non-standard language in business documents, for example, in legal or financial documents, may expose the enterprise to undesirable risk, which may lead to undesirable financial impact. Recent regulations such as Sarbanes-Oxley have underscored and recognized the need for maintaining appropriate control over enterprise processes.

Figure 1:
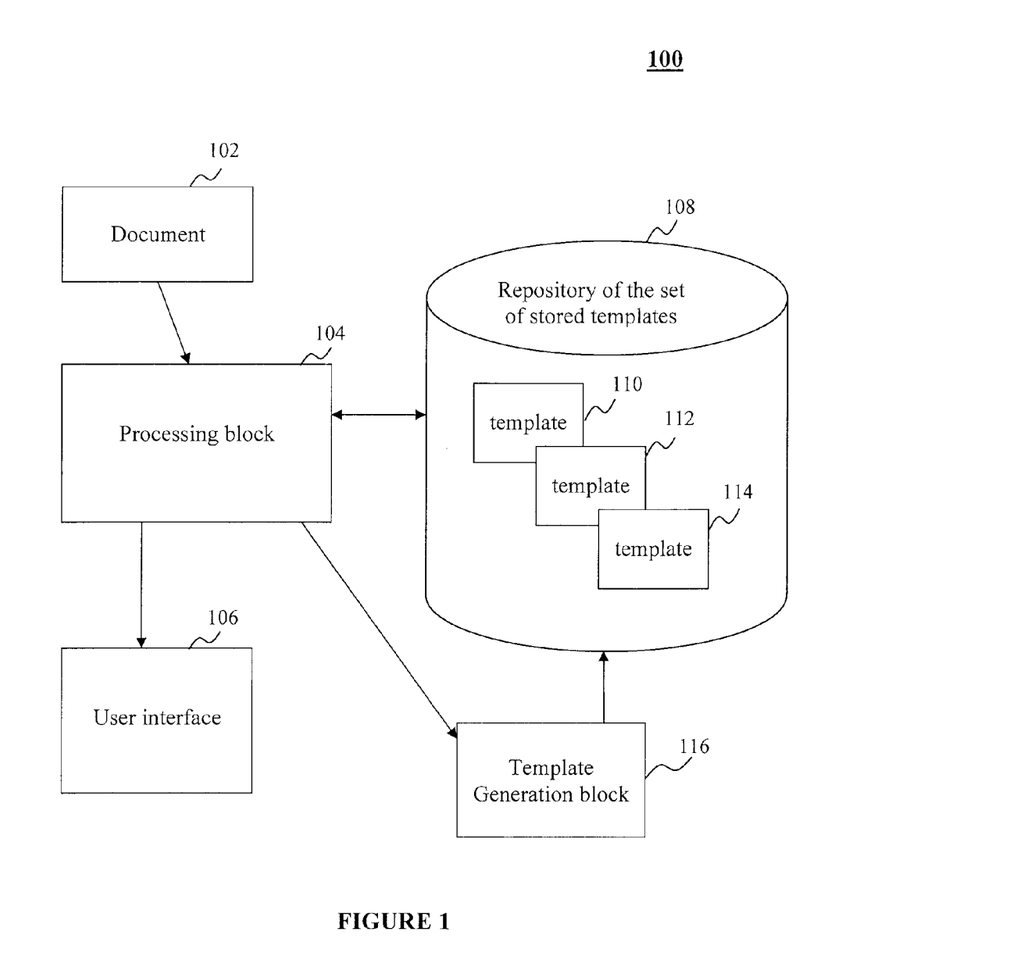
FIG. 1 shows a schematic of analyzing a document in accordance with an exemplary embodiment of the invention.

Embodiments of the invention are directed to a method, a system and a computer program product for analyzing a document. FIG. 1 shows a schematic 100 of analyzing a document in accordance with an exemplary embodiment of the invention. FIG. 1 depicts a document 102, a processing block 104, a user interface 106, a repository of a set of stored templates 108, and a template generation block 116. Repository of the set of stored templates 108 shows three exemplary stored templates 110, 112 and 114.

Document 102 is received by processing block 104 and partitioned into segments by the processing block 104. The portioned document is then aligned and mapped with various segments of at least a subset of templates selected from repository of a set of stored templates 108. Once each of the segments of the portioned document are mapped with the subset of templates from the repository, processing block 104 is then configured to compute a set of scores quantifying a similarity and dissimilarity between the segments of document 102 obtained by partitioning and various segments of at least a subset of templates selected from repository of a set of stored templates 108.

In response to the computed set of scores, in one embodiment it may be determined that document 102 has many dissimilar segments and in that case document 102 is processed for feature extraction and clustering by template generation block 116. In another embodiment it may be determined that document 102 has many similar segments and a few dissimilar segments when compared with at least one template from repository of the set of templates 108, and a comparison along with the corresponding computed set of scores may be displayed by user interface 106 and the dissimilar segments are processed for feature extraction and possibly clustering by template generation block 116. In one embodiment, for the features extracted, a new set of templates may be created and stored in the repository 108.

Figure 2:
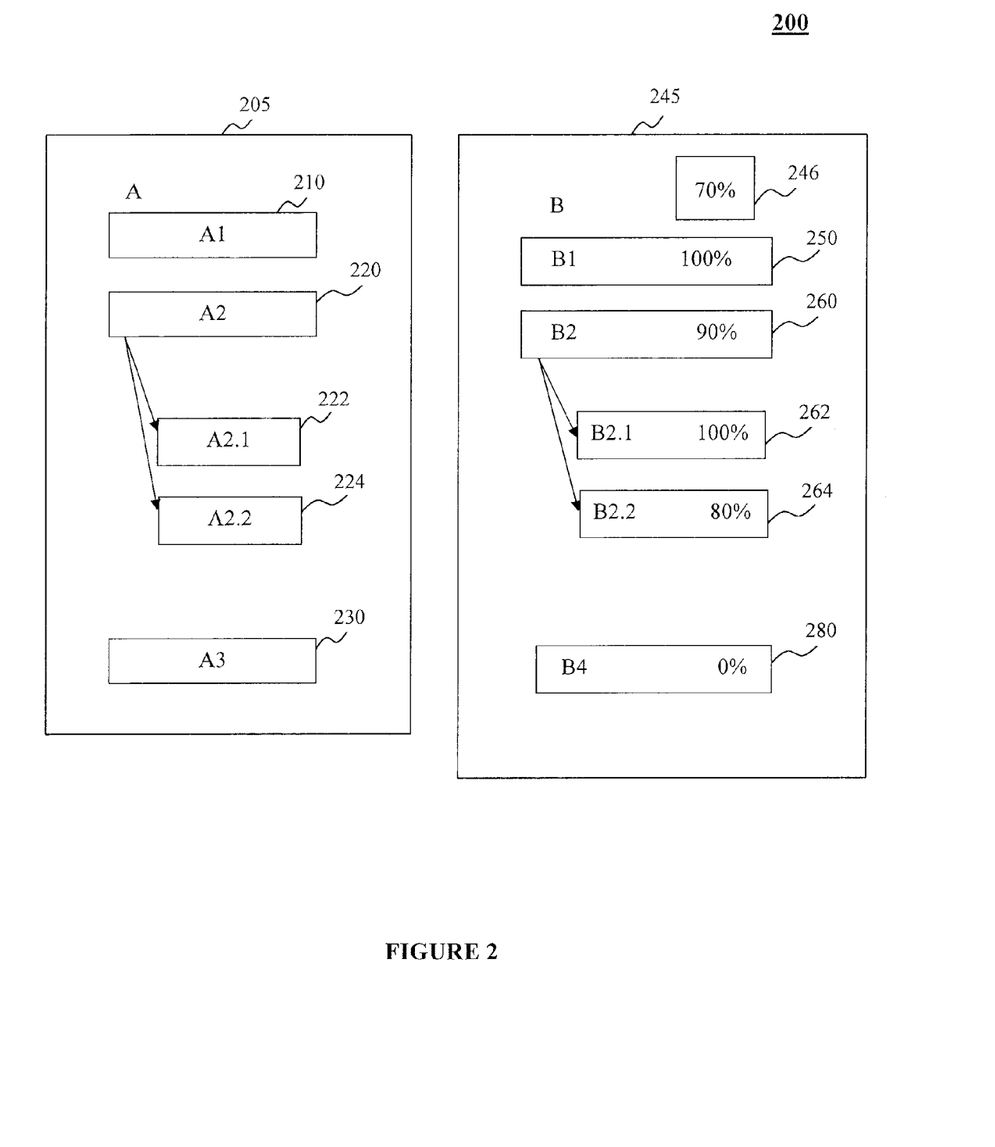
FIG. 2 shows a schematic of a comparison of a document and a template in accordance with an exemplary embodiment of the invention.

FIG. 2 shows a schematic 200 of a comparison of a document and a template in accordance with an exemplary embodiment of the invention. FIG. 2 shows an exemplary comparison shown by user interface. Document 102 of FIG. 1 is shown as document A 205 in FIG. 2. Document A 205 is, in an exemplary mode, portioned into segment as illustrated in A1 210, A2 220, and A3 230 using a set of pre-defined attributes. In an exemplary mode, segment A2 220 is further portioned into sub-segments A2.1 222, and A2.2 224.

FIG. 2 further depicts an exemplary template B 245 which corresponds to one of the templates selected from repository of the set of templates. Similar to document A 205, template B 245 is also portioned into segmented using a set of pre-defined attributes. In an exemplary mode, template B 245 is portioned into segments as B1 250, B2 260, and B4 280. In an exemplary mode, segment B2 260 is further portioned into sub-segments B2.1 262, and B2.2 264. The overall score 246 of mapping document A 205 and template B 245 in this exemplary embodiment is 70%. Similarly, for each of the segments and/or sub-segments a corresponding score is computed. which is indicated alongside the particular segment of FIG. 2.

As an example, the mapping between segment A1 210 of document A 205 and the aligned segment B1 250 of template B245 indicates a score of 100%. which indicates that the segments A1 and B1 are similar in nature. As another example, mapping the sub-segment A2.2 224 of document A 205 and corresponding aligned sub-segment B2.2 264 of template B 245, indicated a computed score of 80%. Similarly exemplary computed score are indicated when a mapping is found between other segments or sub-segments of the document 205 and template 245. For segment A3 230 of document A 205, there is no corresponding segment in template B 245. For segment B4 280 of template B 245, there is no corresponding segment in document A 205. Hence the computed score corresponding to segment B4 260 has a value of 0%.

Figure 3:
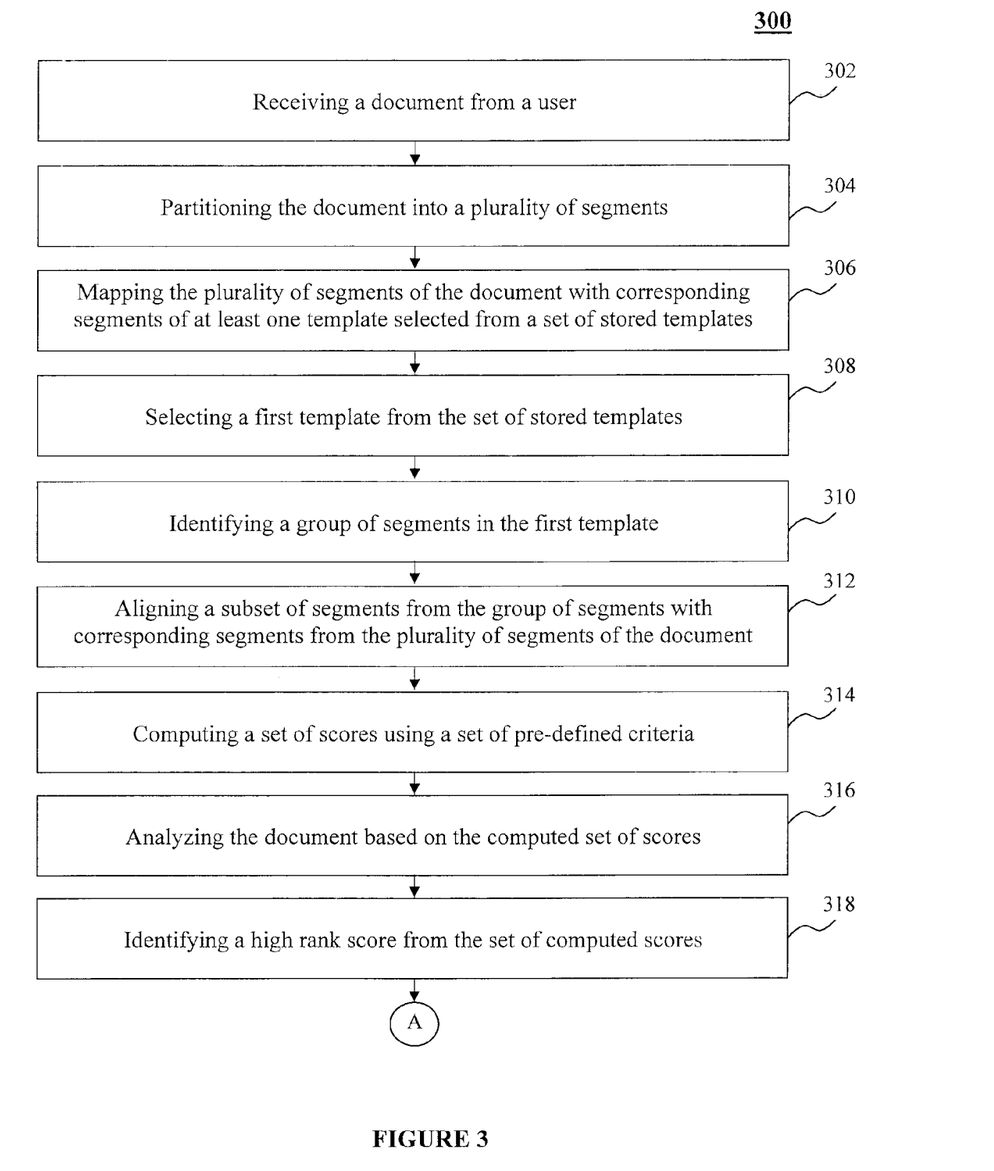
FIG. 3 shows a flow chart for analyzing a document as disclosed in an exemplary embodiment of the invention.

FIG. 3 shows a flow chart of a method 300 for analyzing a document as disclosed in an exemplary embodiment of the invention. In step 302 a document is received from a user, for example a service contract, a legal document and the like. In step 304 the received document is portioned into a plurality of segments using a set of pre-defined attributes. In an exemplary mode, the set of pre-defined attributes may include at least one of a textual attribute or a structural attribute. In step 306 the plurality of segments of the document is mapped with corresponding segments of at least one template selected from a set of stored templates. Further a repository having structured or unstructured data may include the set of stored templates. Step 308 shows selecting a first template from the set of stored templates.

In step 310 a group of segments in the first template is identified by computing at least one of a structural similarity or a textual similarity, associated with the group of segments compared with the plurality of segments of the document, by using at least one of a pre-defined sub-set of textual attributes and a pre-defined sub-set of structural attributes. Pre-defined sub-set of textual attributes, in an exemplary mode, may be the titles or headings of sections of text, such as, for example, "Deliverables" or "Timelines". If the contents of the headings or title don't match above a desirable level, then the details under those headings are not considered for further processing, thus saving time and computation. In step 312 a subset of segments from the group of segments is aligned with corresponding segments from the plurality of segments of the document. In step 314 a set of scores is computed using a set of pre-defined criteria, in response to the mapping. In an exemplary mode, the set of pre-defined criteria may include at least one of a structural similarity and a textual similarity. In step 316 the document is analyzed based on the computed set of scores. In step 318 a high rank score is identified from the set of computed scores, and in step 320 the high rank score is compared with a pre-defined score threshold.

If the high rank score is greater than or equal to the pre-defined score threshold, then steps 322 through 330 are performed. In step 322 a first set of templates having corresponding computed scores greater than or equal to the pre-defined score threshold is generated, from the set of stored templates in response to the computed score. In step 324 the first set of templates is presented to a user in response to the computed set of scores and in step 326 the set of computed scores is displayed to the user using a user interface. In step 328 the plurality of segments of the document and the corresponding segments of at least one template from the first set of templates is displayed using the user interface and in step 330 segments of at least one of the document or at least one template from the first set of templates is displayed, having no match with corresponding segments, using the user interface and updating the set of stored templates using the document. Updating the set of stored templates with segments not having a corresponding match, may include in one embodiment, extracting features of unmatched segments and employing techniques such as, for example, clustering, to evolve newer elements of the segments in the set of templates which may potentially improve the usability of the set of stored templates.

If the high rank score is less than the pre-defined score threshold, steps 332 through 336 are performed. In step 332 a set of features from the document is extracted and in step 334 a group of templates having the set of features. Step 336 depicts updating the set of stored templates is generated using the generated group of templates.

Figure 4:
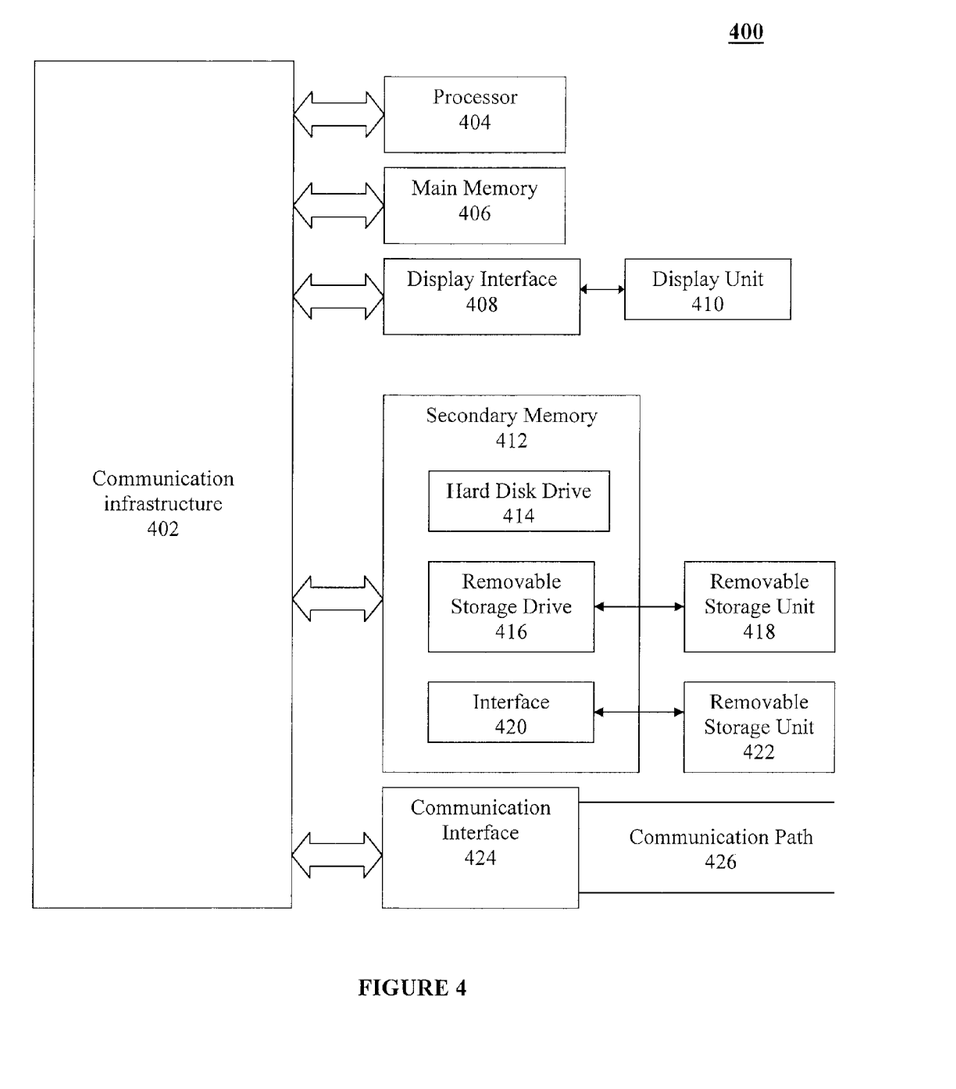
FIG. 4 shows an exemplary schematic of a computer system used for analyzing a document as disclosed in FIG. 1, FIG. 2 and FIG. 3.

FIG. 4 shows a detailed schematic of a computer system used for analyzing a document. FIG. 4 is a block diagram of an exemplary computer system 400 that can be used for implementing various embodiments of the invention. In some embodiments, the computer system 400 can be used as a system executing the schematic 100 of FIG. 1, the schematic 200 of FIG. 2, and can also be used to perform the method 300 described in FIG. 3. The computer system 400 includes at least a processor 404. It should be understood although FIG. 4 illustrates a single processor, one skilled in the art would appreciate that more than one processor can be included as needed. The processor 404 is connected to a communication infrastructure 402 (for example, a communications bus, cross-over bar, or network) where the communication infrastructure 404 is configured to facilitate communication between various elements of the exemplary computer system 400. Various software embodiments are described in terms of this exemplary computer system. After reading this description, it will become apparent to a person of ordinary skill in the relevant art(s) how to implement the invention using other computer systems and/or computer architectures.

Exemplary computer system 400 can include a display interface 408 configured to forward graphics, text, and other data from the communication infrastructure 402 (or from a frame buffer not shown) for display on a display unit 410. The computer system 400 also includes a main memory 406, which can be random access memory (RAM), and may also include a secondary memory 412. The secondary memory 412 may include, for example, a hard disk drive 414 and/or a removable storage drive 416, representing a floppy disk drive, a magnetic tape drive, an optical disk drive, etc. The removable storage drive 416 reads from and/or writes to a removable storage unit 418 in a manner well known to those having ordinary skill in the art. The removable storage unit 418, represents, for example, a floppy disk, magnetic tape, optical disk, etc. which is read by and written to by the removable storage drive 416. As will be appreciated, the removable storage unit 418 includes a computer usable storage medium having stored therein computer software and/or data.

In exemplary embodiments, the secondary memory 412 may include other similar means for allowing computer programs or other instructions to be loaded into the computer system. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to the computer system 400.

The computer system 400 may also include a communications interface 424. The communications interface 424 allows software and data to be transferred between the computer system and external devices. Examples of the communications interface 424 may include a modem, a network interface (such as an Ethernet card), a communications port, a PCM-CIA slot and card, etc. Software and data transferred via the communications interface 424 are in the form of signals which may be, for example, electronic, electromagnetic, optical, or other signals capable of being received by communications interface 424. These signals are provided to the communications interface 424 via a communications path (that is, channel) 426. The channel 426 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as the main memory 406 and the secondary memory 412, the removable storage drive 416, a hard disk installed in the hard disk drive 414, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network that allows a computer to read such computer readable information.

Computer programs (also referred to herein as computer control logic) are stored in the main memory 406 and/or the secondary memory 412. Computer programs may also be received via the communications interface 424. Such computer programs, when executed, can enable the computer system to perform the features of exemplary embodiments of the present invention as discussed herein. In particular, the computer programs, when executed, enable the processor 404 to perform the features of the computer system 400. Accordingly, such computer programs represent controllers of the computer system.

Embodiments of the invention also provide a system for analyzing a document, the system including at least one processor and at least one memory. Embodiments of the invention further provide a computer program product for analyzing a document, the computer program product including a computer readable storage medium having computer readable program code embodied therewith, the computer readable program code including computer readable program code configured to carry out a method of analyzing a document as described in the various embodiments set forth above and described in detail.

Advantages of various embodiments of the invention include improved performance and less response time in analyzing documents. Advantages of various embodiments of the invention also include improved consistency across a policy for an enterprise and also with respect to external vendors and business partners. Advantages of various embodiments of the invention further include potential risk reduction: financial, legal or otherwise, due to potentially better control over standardized and more methodical development of contracts.

The described techniques may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the invention.

What is claimed is:

1. A computing device implemented method for analyzing a document, the method comprising:
   receiving a document;
   partitioning the document into a plurality of segments using a set of pre-defined attributes;
   mapping the plurality of segments of the document with corresponding segments of at least one template selected from a set of stored templates;
   computing a set of scores using a set of pre-defined criteria, in response to the mapping;
   analyzing the document based on the computed set of scores;
   identifying a high rank score from the set of computed scores;
   comparing the high rank score with a pre-defined score threshold; and
   if the high rank score is greater than or equal to the pre-defined score threshold:
      generating a first set of templates having corresponding computed scores greater than or equal to the pre-defined score threshold, from the set of stored templates in response to the computed scores;
      presenting the first set of templates to a user in response to the computed set of scores;
      displaying the set of computed scores to the user using a user interface;
      displaying the plurality of segments of the document and the corresponding segments of at least one template from the first set of templates using the user interface;
      displaying segments of at least one of the document or at least one template from the first set of templates having no corresponding match using the user interface; and
      updating the set of stored templates using the document.

2. The method of claim 1, wherein:
   the set of pre-defined attributes comprises at least one of a textual attribute or a structural attribute; and
   said display comprises displaying the set of computed scores.

3. The method of claim 1, wherein:
   the set of pre-defined criteria includes at least one of a structural similarity or a textual similarity; and
   said displaying comprises displaying segments of at least one of the document or at least one template from the first set of having no corresponding match.

4. The method of claim 1, wherein a repository including structured or unstructured data comprises the set of stored templates.

5. The method of claim I, wherein the step of mapping comprising:
   selecting a first template from the set of stored templates;
   identifying. a group of segments in the first template by computing at least one of a structural similarity or a textual similarity, associated with the group of segments compared with the plurality of segments of the document, using at least one of a pre-defined sub-set of textual attributes and a pre-defined sub-set of structural attributes; and
   aligning a subset of segments from the group of segments with corresponding segments from the plurality of segments of the document.

6. The method of claim 1, further comprising:
   if the high rank score is less than the pre-defined score threshold:
      extracting a set of features from the document;
      generating a group of templates having the set of features; and
      updating the set of stored templates using the generated group of templates.

7. A system for analyzing a document, the system comprising at least one processor and at least one memory, wherein the processor is adapted to:
   receive a document;
   partition the document into a plurality of segments using a set of pre-defined attributes;
   map the plurality of segments of the document with corresponding segments of at least one template selected from a set of stored templates;
   compute a set of scores using a set of pre-defined criteria, in response to the mapping;
   analyze the document based on the computed set of scores;
   identify a high rank score from the set of computed scores;
   compare the high rank score with a pre-defined score threshold; and
   if the high rank score is greater than or equal to the pre-defined score threshold:
      generate a first set of templates having corresponding computed scores greater than or equal to the pre-defined score threshold, from the set of stored templates in response to the computed score;
      present the first set of templates to a user in response to the computed set of scores:
      display the set of computed scores to the user using a user interface;
      display the plurality of segments of the document and the corresponding segments of at least one template from the first set of templates using the user interface:
      display segments of at least one of the document or at least one template from the first set of templates having no corresponding match using the user interface; and
      update the set of stored templates using the document.

8. The system of claim 7, wherein the set of pre-defined attributes comprises at least one of a textual attribute or a structural attribute, and wherein the set of pre-defined criteria includes at least one of a structural similarity and a textual similarity, and further wherein the document is a service contract, 9. The system of claim 7, wherein the processor is further adapted to:
   select a first template from the set of stored templates;

identify a group of segments in the first template by computing at least one of a structural similarity or a textual similarity, associated with the group of segments compared with the plurality of segments of the document, using at least one of a pre-defined sub-set of textual attributes and a pre-defined sub-set of structural attributes; and align a subset of segments from the group of segments with corresponding segments from the plurality of segments of the document.

10. The system of claim 7, wherein the processor is further adapted to if the high rank score is less than the pre-defined score threshold:

extract a set of features from the document;

generate a group of templates having the set of features; and update the set of stored templates using the generated group of templates.

11. A computer program product for analyzing a document, the computer program product comprising:

a computer readable storage medium having computer readable program code embodied therewith, the computer readable program code comprising computer readable program code configured to:

receive a document;

partition the document into a plurality of segments using a set of pre-defined attributes;

map the plurality of segments of the document with corresponding segments of at least one template selected from a set of stored templates;

compute a set of scores using a set of pre-defined criteria, in response to the mapping;

analyze the document based on the computed set of scores;

identify a high rank score from the set of computed scores;

compare the high rank score with a pre-defined score threshold; and if the high rank score is greater than or equal to the pre-defined score threshold:

generate a first set of templates having corresponding computed scores greater than or equal to the pre-defined score threshold, from the set of stored templates in response to the computed score;

present the first set of templates to a user in response to the computed set of scores:

display the set of computed scores to the user using a user interface;

display the plurality of segments of the document and the corresponding segments of at least one template from the first set of templates using the user interface:

display segments of at least one of the document or at least one template from the first set of templates having no corresponding match using the user interface; and update the set of stored templates using the document.

12. The computer program product of claim 11, wherein the set of pre-defined attributes comprises at least one of a textual attribute or a structural attribute, and wherein the set of pre-defined criteria includes at least one of a structural similarity and a textual similarity, and further wherein the document is a service contract.

13. The computer program product of claim 11, further configured to:

select a first template from the set of stored templates;

identify a group of segments in the first template by computing at least one of a structural similarity or a textual similarity, associated with the group of segments compared with the plurality of segments of the document, using at least one of a pre-defined sub-set of textual attributes and a pre-defined sub-set of structural attributes; and align a subset of segments from the group of segments with corresponding segments from the plurality of segments of the document.

14. The computer program product of claim 11, further configured to:

if the high rank score is less than the pre-defined score threshold:

extract a set of features from the document;

generate a group of templates having the set of features; and update the set of stored templates using the generated group of templates.

* * * * *